UNITED STATES PATENT OFFICE.

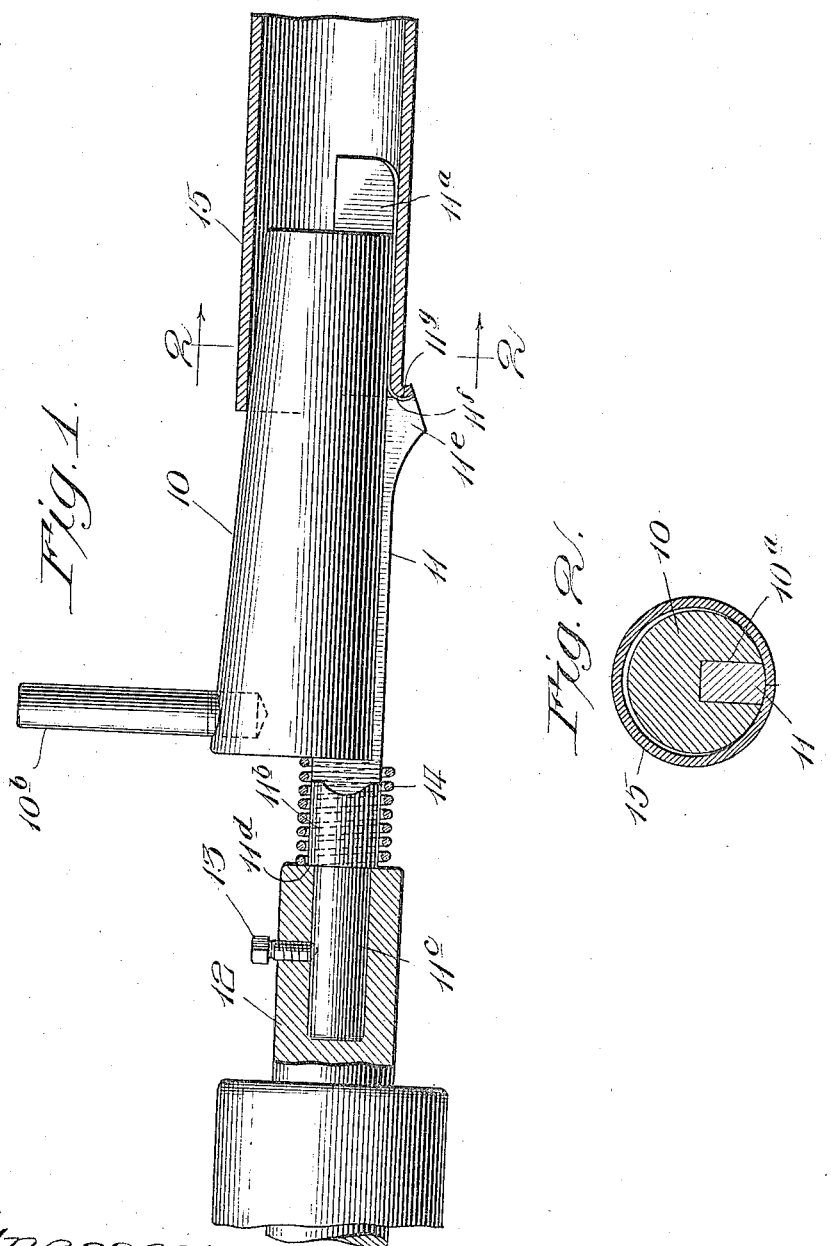

FREDERICK J. HOWE, OF AURORA, ILLINOIS.

BEADING-TOOL.

1,301,940.	Specification of Letters Patent.	Patented Apr. 29, 1919.

Application filed December 8, 1913. Serial No. 805,419.

*To all whom it may concern:*

Be it known that I, FREDERICK J. HOWE, a citizen of the United States, residing at Aurora, in the county of Kane and State of Illinois, have invented certain new and useful Improvements in Beading-Tools, of which the following is a specification.

This invention relates to improvements in beading tools, and has for its object to provide a new and improved tool for the beading or over-turning of tube ends or the like. My tool is especially adapted for beading the ends of flue tubes where they project through a boiler plate or the like.

These and other objects will be explained and set forth in the following specification and accompanying drawings, in which;

Figure 1 is a side elevation partially in section, of my improved tool showing a partially beaded tube;

Fig. 2 is a transverse section along the line 2—2 of Fig. 1.

Like numerals refer to like elements throughout the drawings.

My invention comprises a tapered guide or mandrel 10, tapered from one end toward the other, as clearly shown in Fig. 1, and provided with the longitudinal slot 10$^a$ running from one end to the other thereof. The beading member or tool proper is designated by numeral 11, and is formed with a flattened or rectangular portion 11$^a$ merging into the enlarged cylindrical portion or shank 11$^b$, having in turn a reduced engageable portion 11$^c$ forming a part of such shank, thereby providing a shoulder 11$^d$ between the reduced and enlarged portions of the shank, as clearly indicated in Fig. 1. The beading member 11 is provided with the outwardly extending shoulder portion 11$^e$ having a concaved end 11$^f$ constructed with the convex or rounded surface 11$^g$, as shown in Fig. 1. The flattened portion 11$^a$ of the tool is of such cross section as to enable it to fit snugly in the aperture 10$^a$ while permitting reciprocation therein. The reduced shank portion 11$^c$ is adapted to fit in the socket of a reciprocating chuck 12 of a power hammer or the like and is detachably secured therein by set screw 13. A coil spring 14 is preferably located between the end of the chuck 12 and the adjacent end of the mandrel 10.

When the device is in use, as shown in Fig. 1, the tapered mandrel 10 is set in the end of a tube 15, for example, which is to be beaded or over-turned, and the chuck 12 is reciprocated causing the beading member 11 to reciprocate therewith being guided in its movement by the slot 10$^a$ of the guide member or mandrel 10. The beading shoulder end 11$^f$ will operate to outwardly curve or bead the end of the tube, as clearly shown in the drawing, the convex surface 11$^g$ thereof providing a smooth surface on the beaded end of the tube 15. A handle 10$^b$ is threaded into engagement with the mandrel 10 and may be utilized to slowly rotate the same as the beading operation continues, so that the entire end of the tube may be beaded upon complete rotation of the mandrel or guide 10. The coil spring 14 being compressed between the end of the chuck 12 and the mandrel 10 will operate to maintain the latter in the end of the tube 15, the taper of the mandrel serving to locate the same in the tube and at the same time enabling its application to tubes of varying diameter within certain limits. Furthermore, this taper will prevent the insertion of the mandrel or guide too great a distance in the tube 15.

It is obvious that while I have explained and shown one specific embodiment of my invention, the same is capable of many modifications, and I do not wish to be restricted to the form shown and described, beyond the scope of the appended claims.

What I claim is:—

1. In a device of the class described, a guide member, a beading member reciprocably mounted on said guide member, a reciprocating member directly connected to said beading member to positively reciprocate the same, and a coil spring mounted on said beading member and engaging said guide member to maintain the latter in a tube to be beaded.

2. In a device of the class described, a guide member adapted to fit in the end of a tube or the like, a beading member reciprocably mounted in said guide member, said beading member having a portion projecting beyond said guide member and adapted to engage a reciprocating member, and means carried by said beading member to maintain said guide member in said tube.

3. In a device of the class described, a guide member of circular cross section adapted to engage the end of a tube or the like, a reciprocating member slidably mounted in said guide member and having a beading member formed thereon, said reciprocating member having a projecting part adapted to engage a driving reciprocating member, and a coil spring surrounding said reciprocating member and having its ends adapted to engage said guide member and driving reciprocating member to maintain the guide member in said tube.

4. In a device of the class described, a tapered guide member of circular cross-section adapted to engage a tube or the like, said guide member having a longitudinal groove formed therein, a beading member slidably mounted in said groove, a reciprocating guide member directly connected to said beading member positively to reciprocate the same, and an arm extending laterally from said guide member to rotate the same.

5. In a device of the class described, a tapered guide member adapted to engage the end of a tube, said guide member having a longitudinal groove in one side thereof, a beading member slidably mounted in said groove and arranged to engage the end of said tube, a reciprocating member directly connected to said beading member to reciprocate the same, and means to rotate said guide member.

6. In a device of the class described, a non-reciprocating guide member having a longitudinal groove on one side thereof throughout its length, said guide member being tapered on the side thereof opposite said groove, a beading member mounted in said groove and having a part extending beyond the outer end of said guide member, a reciprocating driving member directly connected to the projecting part of said beading member and spaced therefrom, and resilient means mounted on said beading member between said driving member and said guide member to maintain said guide member in a tube to be beaded.

In testimony whereof, I have subscribed my name.

FREDERICK J. HOWE.

Witnesses:
L. A. STOLL,
E. O. HOLT.

Copies of this patent may be obtained for five cents each, by addressing the "Commissioner of Patents, Washington, D. C."